United States Patent
Mayer et al.

(10) Patent No.: US 9,162,745 B2
(45) Date of Patent: Oct. 20, 2015

(54) AIRCRAFT WITH AN INTEGRATED ENERGY-ABSORBING DEFORMATION STRUCTURE AND AIRCRAFT WITH SUCH A FUSELAGE

(75) Inventors: Franziskus Mayer, Weilheim (DE); Christoph Meisner, Edewecht (DE); Peter Starke, Ottobrunn (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 287 days.

(21) Appl. No.: 13/640,495

(22) PCT Filed: Apr. 9, 2011

(86) PCT No.: PCT/DE2011/000383
§ 371 (c)(1),
(2), (4) Date: Jan. 23, 2013

(87) PCT Pub. No.: WO2011/127899
PCT Pub. Date: Oct. 20, 2011

(65) Prior Publication Data
US 2013/0112811 A1    May 9, 2013

(30) Foreign Application Priority Data
Apr. 12, 2010   (DE) .......................... 10 2010 014 638

(51) Int. Cl.
*B64C 1/06*    (2006.01)
(52) U.S. Cl.
CPC ..................................... *B64C 1/062* (2013.01)
(58) Field of Classification Search
CPC ................ B64C 1/61; B64C 1/62; B64C 1/00
See application file for complete search history.

(56) References Cited

U.S. PATENT DOCUMENTS

| | | | |
|---|---|---|---|
| 5,542,626 A * | 8/1996 | Beuck et al. | 244/107 |
| 5,752,673 A | 5/1998 | Schliwa | |
| 6,948,684 B2 * | 9/2005 | Beral et al. | 244/119 |

(Continued)

FOREIGN PATENT DOCUMENTS

| | | |
|---|---|---|
| DE | 4416506 A1 | 11/1995 |
| DE | 60114455 T2 | 7/2006 |

(Continued)

OTHER PUBLICATIONS

European Patent Office, International Search Report in International Patent Application No. PCT/DE2011/000383 (Oct. 31, 2011).

*Primary Examiner* — Valentina Xavier
(74) *Attorney, Agent, or Firm* — Leydig, Voit & Mayer, Ltd.

(57) ABSTRACT

An aircraft fuselage has an integrated energy-absorbing deformation structure. The fuselage includes annular frames, longitudinal fuselage beams interconnecting the annular frames, and a covering forming a fuselage skin. A lower floor structure is disposed in an interior of the fuselage. The lower floor structure includes a plurality of transverse beams connected to an assigned frame and longitudinal floor beams which interconnect said transverse beams. The deformation structure is formed in a lower fuselage region disposed below the lower floor structure. The deformation structure includes a first inelastically deformable central region and, on a left-hand side and a right-hand side, respective second inelastically deformable regions of greater stiffness in the vertical direction than the central region.

12 Claims, 10 Drawing Sheets

(56) References Cited

U.S. PATENT DOCUMENTS

| | | | |
|---|---|---|---|
| 7,874,516 B2 * | 1/2011 | Cacciaguerra | 244/119 |
| 7,923,096 B2 | 4/2011 | Starke | |
| 8,439,307 B2 * | 5/2013 | Westphal et al. | 244/121 |
| 2010/0096501 A1 * | 4/2010 | Meyer | 244/121 |
| 2011/0042513 A1 * | 2/2011 | Milliere et al. | 244/121 |
| 2014/0001312 A1 * | 1/2014 | Milliere et al. | 244/121 |

FOREIGN PATENT DOCUMENTS

| | | |
|---|---|---|
| DE | 102007038634 B3 | 7/2008 |
| FR | 2903961 A1 | 1/2008 |
| GB | 620863 A | 3/1949 |
| GB | 2444645 A | 6/2008 |
| WO | WO 0246036 A1 | 6/2002 |
| WO | WO 2006051235 A1 | 5/2006 |

* cited by examiner

AIRCRAFT WITH AN INTEGRATED ENERGY-ABSORBING DEFORMATION STRUCTURE AND AIRCRAFT WITH SUCH A FUSELAGE

CROSS REFERENCE TO RELATED APPLICATIONS

This application is a U.S. National Phase application under 35 U.S.C. §371 of International Application No. PCT/DE2011/000383, filed on Apr. 9, 2011, and claims benefit to German Patent Application No. DE 10 2010 014 638.2, filed on Apr. 12, 2010. The International Application was published in German on Oct. 20, 2011, as WO 2011/127899 A1 under PCT Article 21 (2).

FIELD

The present invention relates to an aircraft fuselage comprising an integrated energy-absorbing deformation structure according to the preamble of claim 1. The invention also relates to an aircraft which is provided with such a fuselage.

BACKGROUND

It has long been known for aircraft to be provided, in the lower region, with what are known as crash boxes, which in the case of an emergency landing convert the kinetic energy of the aircraft hitting the ground into deformation work.

It is described in DE 601 14 455 T2 to flatten the annular fuselage frame in the lower region of the fuselage and to provide, below this flattened horizontal frame portion, beams which extend in the longitudinal direction and are designed as energy-absorbing composite beams. These composite beams are mounted on the horizontal frames by means of fastening fittings. These fastening fittings significantly increase the total weight of the aircraft and, if they are made for example of titanium in order to reduce the weight, considerably increase the production costs of the aircraft. In addition, in this region the frames are connected to the fuselage skin only via the deformable longitudinal beams, and therefore, when a transverse force component occurs in the case of a vertical impact of the aircraft, it is to be expected that the deformable longitudinal beams give way laterally.

DE 44 16 506 A1 describes an aircraft fuselage which is provided in its lower region with a lower floor structure which is supported by means of support elements which extend obliquely to the vertical longitudinal centre plane of the aircraft between the lower floor structure and the fuselage frames. Below the lower floor structure, a deformation structure is provided on the outside of the fuselage and considerably increases the aerodynamically effective cross-section of the aircraft.

If beams which are part of an energy-absorbing deformation structure are provided in the lowest region of the fuselage, between a lower floor and the frames, then these beams can convert kinetic energy into deformation energy in the case of an impact on solid ground. However, there is a risk of shear forces occurring in the region in which these beams are mounted on the fuselage frames, which forces can lead to tearing of the fuselage skin or even of the frame in this region in the case of an impact. In the case of an emergency landing on water, water may then undesirably enter the fuselage.

An impulse-absorbing structural component developed by the inventor of the present application is described DE 10 2007 038 634 B3. This structural component consists of an impulse-absorbing layer on which a covering layer is mounted. The impulse-absorbing layer has a regular pattern of elevations and depressions such that, should a mass part impact on the covering layer, an intercept bag forms in the impulse-absorbing layer and dissipates the kinetic energy of the mass part.

SUMMARY

In an embodiment, the present invention provides an aircraft fuselage with an integrated energy-absorbing deformation structure. The fuselage includes annular frames, longitudinal fuselage beams interconnecting the annular frames, and a covering forming a fuselage skin. A lower floor structure is disposed in an interior of the fuselage. The lower floor structure includes a plurality of transverse beams connected to an assigned frame and longitudinal floor beams which interconnect said transverse beams. The deformation structure is formed in a lower fuselage region disposed below the lower floor structure. The deformation structure includes a first inelastically deformable central region and, on a left-hand side and a right-hand side, respective second inelastically deformable regions of greater stiffness in the vertical direction than the central region.

BRIEF DESCRIPTION OF THE DRAWINGS

Exemplary embodiments of the present invention are described in more detail below with reference to the drawings, in which.

DETAILED DESCRIPTION

Figure 1:
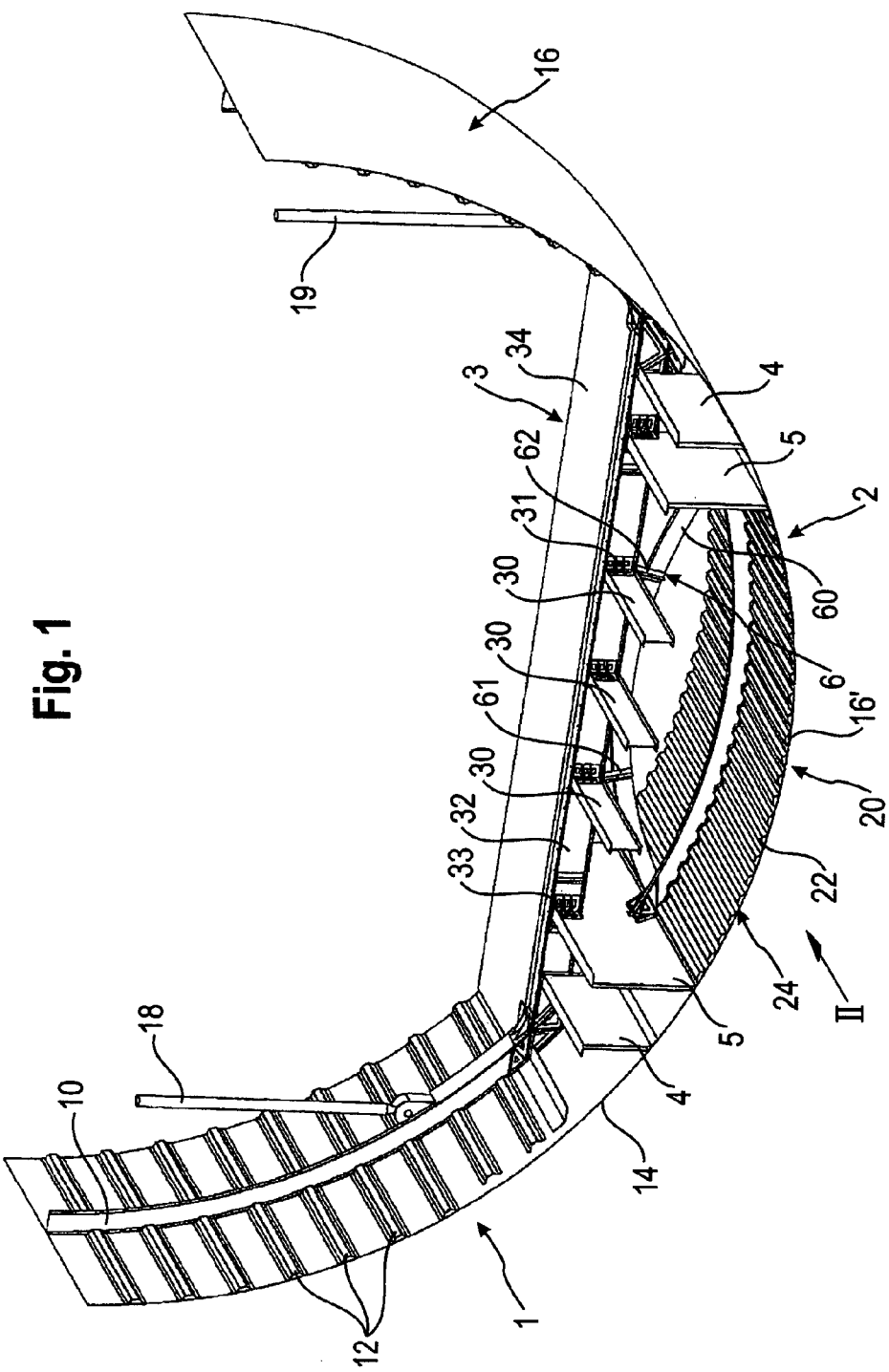
FIG. 1 is a perspective sectional view of a lower segment of an aircraft fuselage according to an embodiment of the invention.

In an embodiment, the present invention provides an aircraft fuselage which comprises an integrated energy-absorbing deformation structure and which allows effective impact damping in the case of the aircraft hitting the ground, and the deformation structure of which largely prevents the formation of cracks in the aircraft outer skin in the case of an emergency landing of the aircraft on water. A further object is to provide an aircraft comprising such a fuselage.

The fuselage comprises annular frames, longitudinal fuselage beams which interconnect the frames, and a covering which forms a fuselage skin. At least a lower floor structure is provided in the interior of the fuselage and comprises a plurality of transverse beams which are connected to an assigned frame and longitudinal floor beams which interconnect these transverse beams. The deformation structure is formed in a lower region of the fuselage situated below the lower floor structure. According to the invention, the deformation structure comprises a first, inelastically deformable central region and, on the left-hand side and the right-hand side, respective second inelastically deformable regions of greater stiffness in the vertical direction, that is to say in the direction of the vertical axis of the aircraft, than the central region. The deformations which occur in the two deformable regions in the case of a crash, for example a crash landing or an emergency landing on water, are irreversible. If the deformation structure is made of metal or comprises deformable metal parts, the metal parts are plastically deformed. However, if the deformation structure is made of fibre composite material, for example carbon fibre composite material (CFRP) or glass fibre composite material (GFRP) or comprises deformable parts made of fibre composite material, then these parts made of fibre composite material are subjected to crushing in the case of a crash.

In the case of an emergency landing on land or on water, the first, central deformable region is pushed in first, before the aircraft is supported on the two second inelastically deformable regions situated to the left and right of said central region (with respect to the vertical longitudinal centre plane of the aircraft).

In the case of an emergency landing on solid ground, the aircraft then skids on the second, lateral inelastically deformable regions, which are gradually worn by friction energy or are likewise inelastically deformed in the case of a relatively powerful vertical impact, in order to dissipate further kinetic energy.

In the case of an emergency landing on water, the first, central deformable region of the deformation structure is likewise pushed inwards first. Since no beams which rigidly support the fuselage frames upwardly are provided in this region, the indentation can occur substantially unimpeded, and therefore the risk of the fuselage skin tearing is low. The fuselage thus remains tight in this region in the case of an emergency landing on water, or at least the entry of water into the fuselage is hindered.

After the first, central region of the deformation structure has been pushed in, the two lateral second inelastically deformable regions form a skid-like structure which operates similarly to the two hulls of catamaran and stabilises the aircraft during its forward movement on the water.

The respective inelastically deformable region of greater stiffness in the vertical direction preferably comprises at least one longitudinal floor beam which is extended downwards beyond the transverse beams of the lower floor structure, is connected in its upper region to the transverse beams of the floor structure, and is connected in its lower region to the frames of the fuselage. This embodiment provides an integrated structure in which the longitudinal floor beam designed in this form becomes part of the deformation structure. This longitudinal floor beam can—as in the prior art—be designed as an energy-absorbing component and takes on the function of a longitudinal beam for the floor structure and the function of the energy absorber in the case of an impact or crash. This dual use of the longitudinal floor beam reduces the weight, the cost and the complexity of assembly compared to the longitudinal beam deformation element which is provided separately in the prior art.

In a preferred embodiment, the first inelastically deformable region situated between the two second inelastically deformable regions is designed as an impulse-absorbing structural component. For this purpose, an impulse-absorbing layer is preferably provided on the inner face of the fuselage skin and in particular is preferably undulating. However, instead of the undulating design, any design in the form of a regular pattern of elevations and depressions is conceivable, as already described in DE 10 2007 038 634 B3. However, the arrangement of an impulse-absorbing structural component of this type in the lowest region of the aircraft fuselage as one of a plurality of crash elements is not known or obvious from this citation.

It is advantageous when no longitudinal fuselage beams which brace the lower floor structure against the fuselage skin or the frames are provided in the fuselage portion which is situated between the two inelastically deformable regions and forms the first inelastically deformable region. As a result, a particularly flexible structure of relatively low stiffness is provided in the first region of the deformation structure, that is to say in the belly of the fuselage, and absorbs and damps the first impact of the aircraft, at least to a certain extent on the ground or particularly effectively on water. In this version, the fuselage frames are positioned and fixed relative to one another in the longitudinal direction of the aircraft by the outer longitudinal floor beams which are connected to the fuselage frames via the transverse floor beams.

It is also advantageous when, between the left-hand inner and right-hand inner downwardly extended longitudinal floor beams, assigned to a respective frame, a support structure is provided which extends in the transverse direction of the aircraft and interconnects the respective lower regions of the lower, downwardly extended longitudinal floor beams, which regions are connected to the assigned frame, for force transmission in the transverse direction. This support structure, together with the transverse beams of the lower floor structure, guides the transverse forces between the two lower portions of the frame to the left and right of the vertical longitudinal centre plane of the aircraft. As a result, the lower part of the respective frame in the region of the first, inelastically deformable central region is for the most part excluded from the force transmission, and therefore deformation of this region does not lead to the collapse of the static system, formed by the frames and longitudinal beams, of the fuselage.

The support structure preferably arches in a curved manner towards the centre of the aircraft and is connected, at least in its central portion, to the assigned transverse beam of the lower floor structure. In this way, particularly effective force transmission is provided via the unit made up of the transverse floor beam and the curved support structure.

The support structure preferably comprises a lattice or a curved beam.

It is also advantageous when the downwardly extended outer longitudinal floor beams, the transverse floor beams of the lower floor structure, and the frames, together with the covering of the fuselage, which covering is connected in this region to the frames, and optionally together with floor panels which are provided in this region and connected to the lower floor structure, form a box profile which is resistant to bending and warping. A box profile of this type is particularly well suited to converting kinetic energy into deformation work if the aircraft hits hard ground, without the entire statics of the fuselage structure failing.

A particularly advantageous embodiment is characterised in that, to connect the transverse beams of the lower floor structure to the frames, fittings are provided which are each fastened on one hand to a lateral end of a transverse beam and on the other hand to the assigned frame. The provision of these fittings provides particularly reliable force transmission between the respective fuselage frame and the transverse beam assigned thereto of the lower floor structure.

It is particularly advantageous when the fittings are each provided with ribs which are arranged in the form of a lattice and extend in the direction of the force components of the forces to be transmitted by the fitting. The ribs then absorb the majority of the forces to be transmitted, and therefore the planar part of the fitting, which part is connected to the respective transverse beam and the respective frame, can be substantially thinner than conventional fittings. In this way, weight can be saved in the fittings. Alternatively—without a weight saving—a more economical material (for example steel instead of titanium) can be used, whereby the production costs are considerably reduced. These fittings provided with ribs can be custom-made for each application in order thus to achieve maximum force transmission at a minimum mass of the fitting. These specially designed fittings are a separate invention and, irrespective of the application in the present aircraft fuselage comprising an integrated energy-absorbing deformation structure, can be used for example in any other aircraft fuselage, in order for example to interconnect frames and transverse floor beams.

In this respect, the present invention also extends to a fitting comprising ribs which are arranged in the form of a lattice and extend in the direction of the force components of the forces to be transmitted by the fitting. The ribs can, in the longitudinal extension thereof, be oriented in directions which, in a resolution of forces, are determined as main force transmission directions by means of a parallelogram of forces or by means of finite elements. The height and/or thickness of the respective ribs can then be configured in accordance with the size of the individual force components. The fitting is preferably formed in one piece, for example as a casting, moulding or as a forging and can comprise planar portions which are integrated between the ribs and used for example to fasten the fitting, in that they are provided for example with throughholes for screws, rivets or other fastening bolts.

In the event of a crash or impact, fittings of this type provided with ribs also have the advantage that the fittings too can be deformed and thereby convert kinetic energy into deformation work, which is not possible, or at least not to a significant extent, in the case of the solid fittings used up to now.

The part of the object directed to the aircraft is achieved by the features set out in claim 10. In particular, the fuselage according to the invention is applied in a fixed-wing aircraft or in a rotorcraft.

FIG. 1 shows the lower half of a fuselage segment of an aircraft fuselage 1 which according to an embodiment of the invention is provided in its lowest region, the belly of the aircraft, with a deformation structure 2. The fuselage comprises a plurality of such fuselage elements comprising annular frames 10, only one of which is shown in the fuselage segment shown in FIG. 1. The frames 10 are arranged in succession and with mutual spacing in the longitudinal direction of the aircraft in a conventional manner. Longitudinal fuselage beams 12 extend in the longitudinal direction of the aircraft and interconnect the individual frames. A plurality of longitudinal fuselage beams 12 are arranged with mutual spacing along the periphery of the fuselage. A covering 14 fastened externally to the frames 10 and the longitudinal fuselage beams 12 forms a fuselage skin 16.

A lower floor structure 3 is provided in the lower region of the fuselage interior. The lower floor structure 3 comprises a plurality of longitudinal beams 4, 5, 30 and transverse beams 32 connected thereto. Each transverse beam 32 is connected at the ends thereof to an assigned fuselage frame 10. Floor panels 34 are mounted on the floor structure formed of the transverse beams 32 and longitudinal beams 4, 5, 30 and form the floor of a lower space in the fuselage of the aircraft. The floor structure 3 is provided with two different types of longitudinal beam. The central longitudinal floor beams 30 are designed in a conventional manner and have a height which corresponds approximately to the height of the transverse beams 32. The longitudinal beams 30 are fastened to the transverse beams 32 by means of fastening brackets 31 which are fastened to the longitudinal beams 30 and to the transverse beams 32 by means of bolt connections, for example by means of rivets.

The lateral longitudinal floor beams 4, 5 are connected to the respective transverse beams 32 in the same way by means of fastening brackets 33. However, in the vertical direction, that is to say in the direction of the vertical axis of the aircraft, the lateral longitudinal beams 4, 5 extend downwards to the inner face of the fuselage skin 16. The construction and function of the lateral longitudinal floor beams 4, 5 in the event of an impact during an emergency landing on land or on water will be described in detail below with reference to FIG. 2.

A first, inelastically deformable central region 20 of the deformation structure 2 is formed between the two inner downwardly extended longitudinal floor beams 5. In this central region 20, a fuselage skin portion 16' of the fuselage skin 16 of the aircraft is provided, on the inner face facing the centre of the fuselage, with an impulse-absorbing layer 22 which comprises a regular pattern of elevations and depressions and in the example shown is in the form of a wave profile, in which wave troughs and wave peaks extend in the longitudinal direction of the aircraft. This central fuselage skin portion 16' and the impulse-absorbing layer 22 mounted on the inner face together form an impulse-absorbing structural part 24 which extends between two adjacent frames 10 in the longitudinal direction of the aircraft. The frames 10 maintain the shape of the fuselage skin in this region and ensure the desired outer contour of the fuselage. Since the wave profile extends in the longitudinal direction of the aircraft, additional longitudinal fuselage beams 12 can be omitted in this first, inelastically deformable central region 20, and therefore no longitudinal fuselage beams which brace the lower floor structure 3 against the fuselage skin 16 or the frames 10 are provided in the fuselage portion which is situated between the two inner downwardly extended longitudinal floor beams 5 and forms the first inelastically deformable region 20.

A curved support structure 6 which extends in the transverse direction of the aircraft and is assigned to a frame 10 is provided between the left-hand and right-hand inner downwardly extended longitudinal floor beams 5. This curved support structure 6 connects the respective lower regions of the inner downwardly extended longitudinal floor beams 5, which regions are connected to the frame 10, and is connected in this region to the frame 10 and the longitudinal floor beam 5 via corresponding fittings 64. The curved support structure 6 comprises a curved beam 60 which arches inwards towards the centre of the aircraft, the central portion of which beam contacts the transverse beam 32 of the floor structure 3, and which beam in this case is connected to the transverse beam 32 in the region of the central longitudinal floor beam. Supports 61, 62 connect the curved beam 60 to the two adjacent longitudinal floor beams extending to the left and right of the central longitudinal floor beam in the region of the connection of these two beams to the transverse beam 32. In this way, a free cavity 21 is formed between the frame 10 and the curved support structure 6 in the central region of the lower fuselage portion between the two inner downwardly extended longitudinal floor beams 5, into which cavity the fuselage portion, formed as an impulse-absorbing structural component 24, of the first inelastically deformable region 20 can collapse in an unimpeded manner in the case of a belly landing, as shown for example in FIG. 7.

Figure 2:
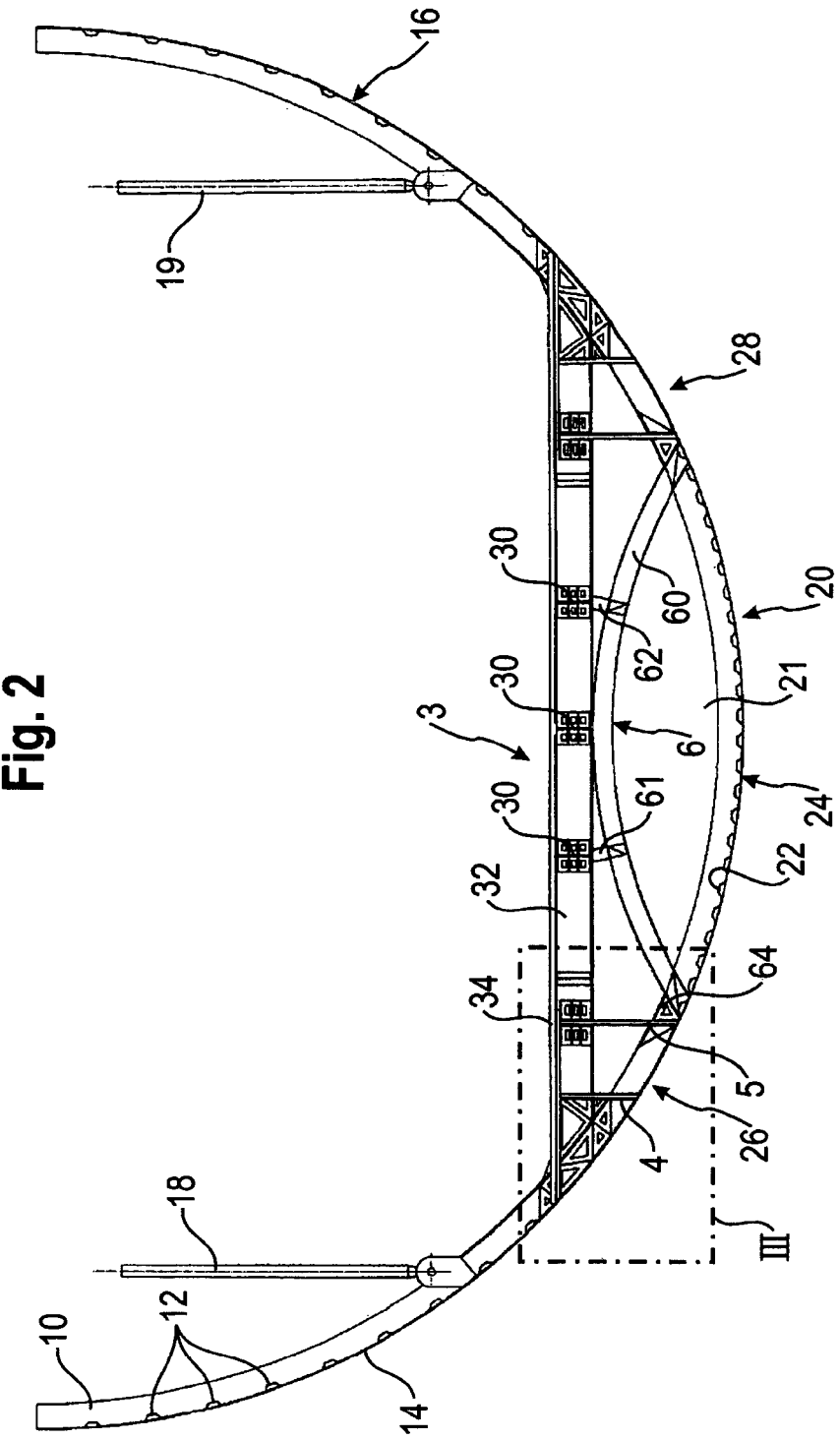
FIG. 2 is a sectional view, in the direction of arrow II, of the fuselage segment shown in FIG. 1.

FIG. 2 shows, in cross-section, the lower part of the fuselage segment shown in FIG. 1. Left-hand and right-hand vertical supports 18, 19 of an upper floor structure are shown on the left and right above the connection of the lower floor structure 3 to the fuselage frame 10.

Figure 3:
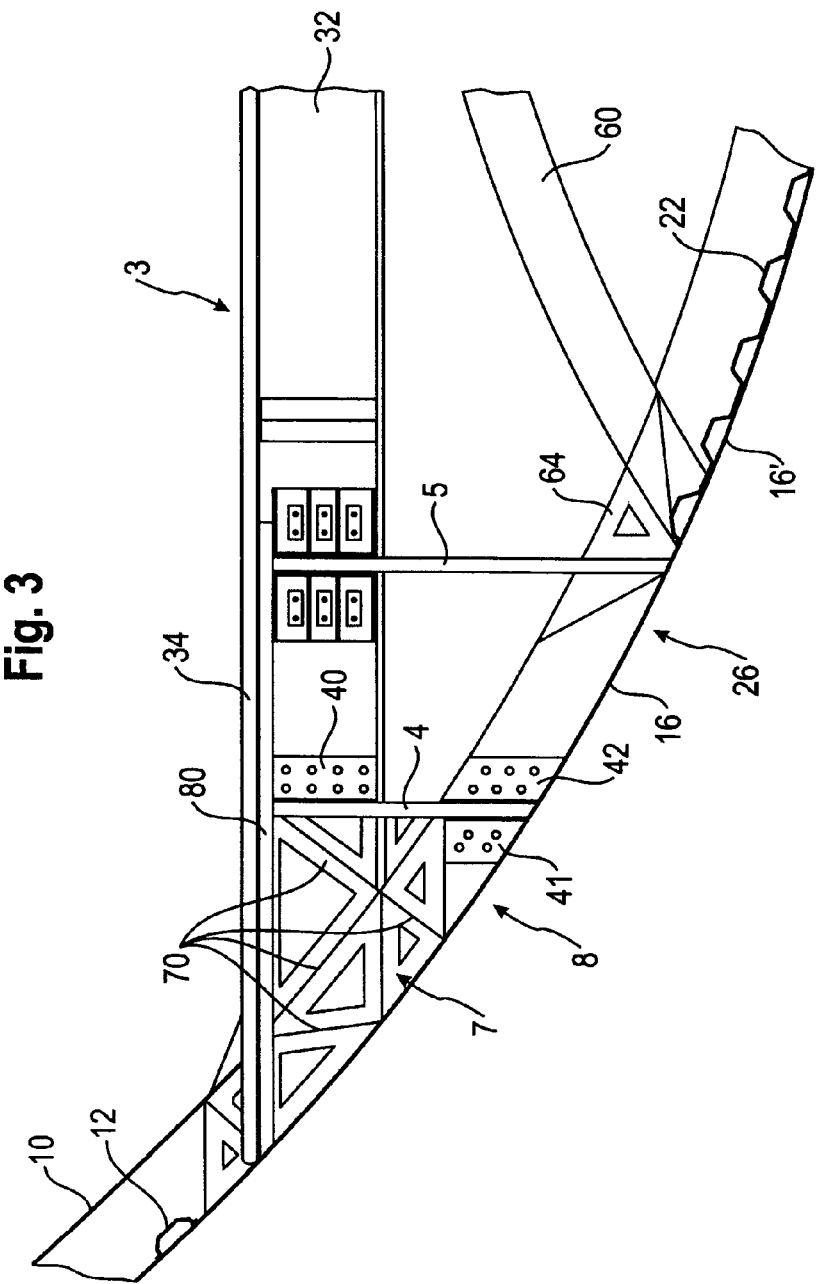
FIG. 3 is an enlarged view of the detail III in FIG. 2.

In the region of the two downwardly extended longitudinal floor beams 4, 5, two lateral second inelastically deformable regions 26, 28 are formed to the left and right of the first, inelastically deformable central region 20, the construction and function of which lateral regions is described in detail with reference to FIG. 3 on the basis of the second inelastically deformable region 26. The other lateral inelastically deformable region 28 is constructed as the mirror image thereof and therefore will not be described in detail.

An outer longitudinal floor beam 4 is mounted in the immediate vicinity of the end-face end of the transverse floor beam 32 of the lower floor structure 3 by means of conventional fastening brackets 40 and extends downwards from the transverse beam 32 to the inner face of the fuselage skin 16, where it is connected to the fuselage skin 16 in a manner known per se, for example by means of rivets. The lateral longitudinal floor beam 4 is likewise connected in a conventional manner, for example riveted, to the frame 10, for example by means of suitable fastening brackets 41, 42.

A fitting 7 provided with ribs 70 arranged in the form of a lattice is mounted at the end-face end of the transverse beam 32 and is rigidly connected in a conventional manner, for example riveted, to the transverse beam 32, the outer longitudinal floor beam 4 and the frame 10. The ribs 70 of the fitting 7 extend as elevations on a planar fitting base in the direction of the force components which are to be transmitted between the transverse beam 32 and the frame 10 by the fitting 7, whereby the fitting 7 combines a high loading capacity in the required force directions with a low weight.

A cover plate 80 is provided between every two adjacent transverse floor beams 32 and is connected in a conventional manner, for example by means of suitable brackets and rivet fastenings, to the transverse beam 32, the two lateral downwardly extended longitudinal floor beams 4, 5 and the fitting 7. The transverse beam 32, the cover plates 80, the frames 10, the longitudinal floor beams 4 and 5 and the fuselage skin 16 thus form a stable box profile 8 which for its part forms the second inelastically deformable region 26.

Figure 7:
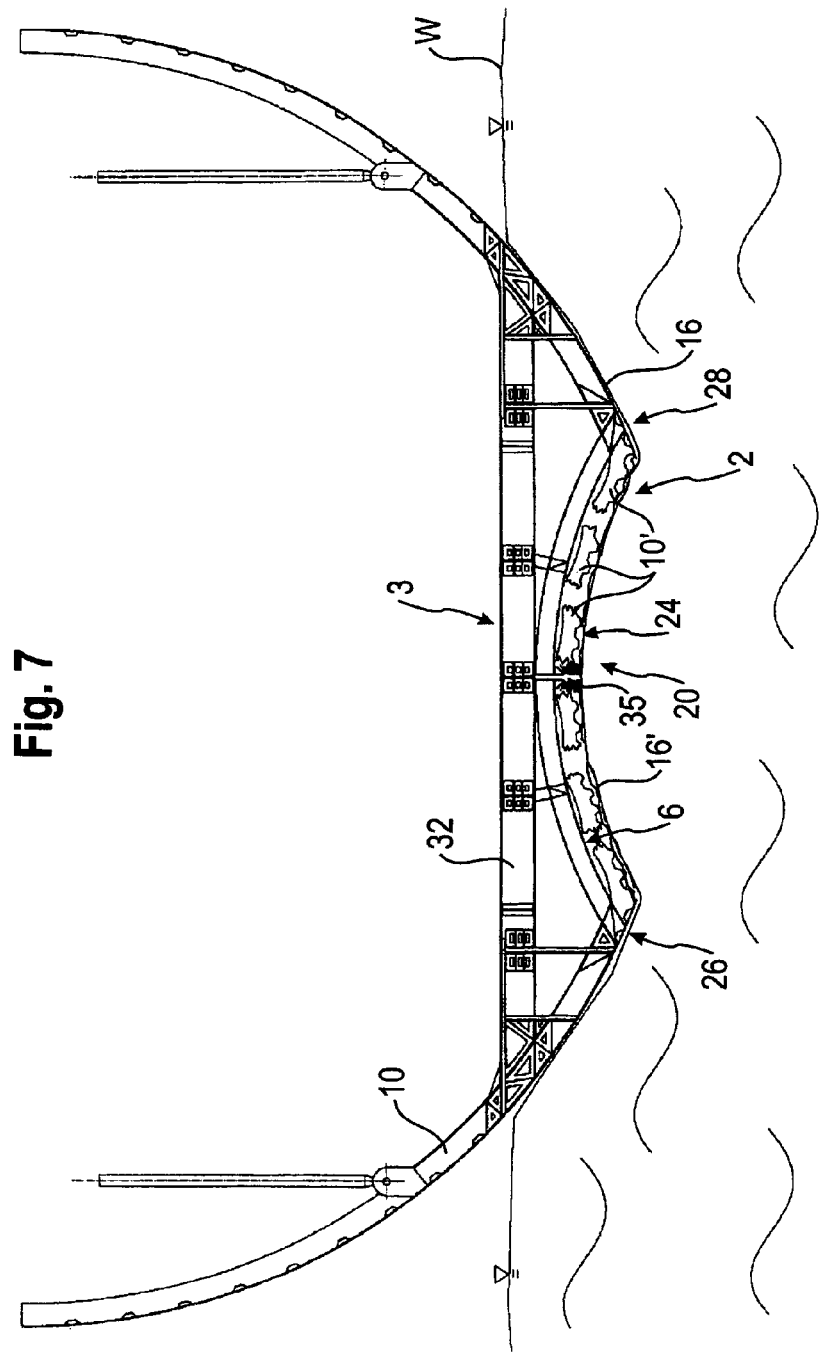
FIG. 7 is a sectional view through the embodiment of FIG. 2 after an emergency landing on water.

In particular the vertical supports formed by the lateral longitudinal floor beams 4, 5 give the respective lateral inelastically deformable regions 26, 28 greater strength (stiffness) in the vertical direction, that is to say in the direction of the vertical axis of the aircraft, than the central inelastically deformable region 20 has. For this reason, in the case of a belly landing, the central inelastically deformable region 20 is pushed in first, as shown in FIG. 7, before, if the aircraft hits solid ground with a relatively powerful impact, the lateral inelastically deformable regions 26, 28 then absorb energy and convert it into deformation work, as shown for example in FIG. 8.

The material used for the deformable regions 20, 26, 28 is specially adapted to the task of absorbing maximum energy and converting it into deformation work. Thus, for example, the impulse-absorbing layer 22 consists of a fibre composite material, preferably of carbon fibre composite material (CFRP), of a mixture of glass fibre and CFRP or only of glass fibre composite material. The glass fibre material used has a high elongation at break of more than 5% so as to be able to convert as much energy as possible into deformation work.

The central fuselage skin portion 16' in the central inelastically deformable region 20 and preferably also in the two lateral inelastically deformable regions 26, 28 can consist of light metal, a metal/fibre composite material, of CFRP or of a mixture of CFRP with glass fibre content, glass fibres having an elongation at break of more than 5% being used in this case too.

The two downwardly extended lateral longitudinal floor beams 4, 5 can consist of light metal, for example aluminium, or a metal/fibre composite material, of CFRP or of CFRP with a glass fibre content. In this case too, glass fibres having an elongation at break of more than 5% are preferably used.

Figure 4:
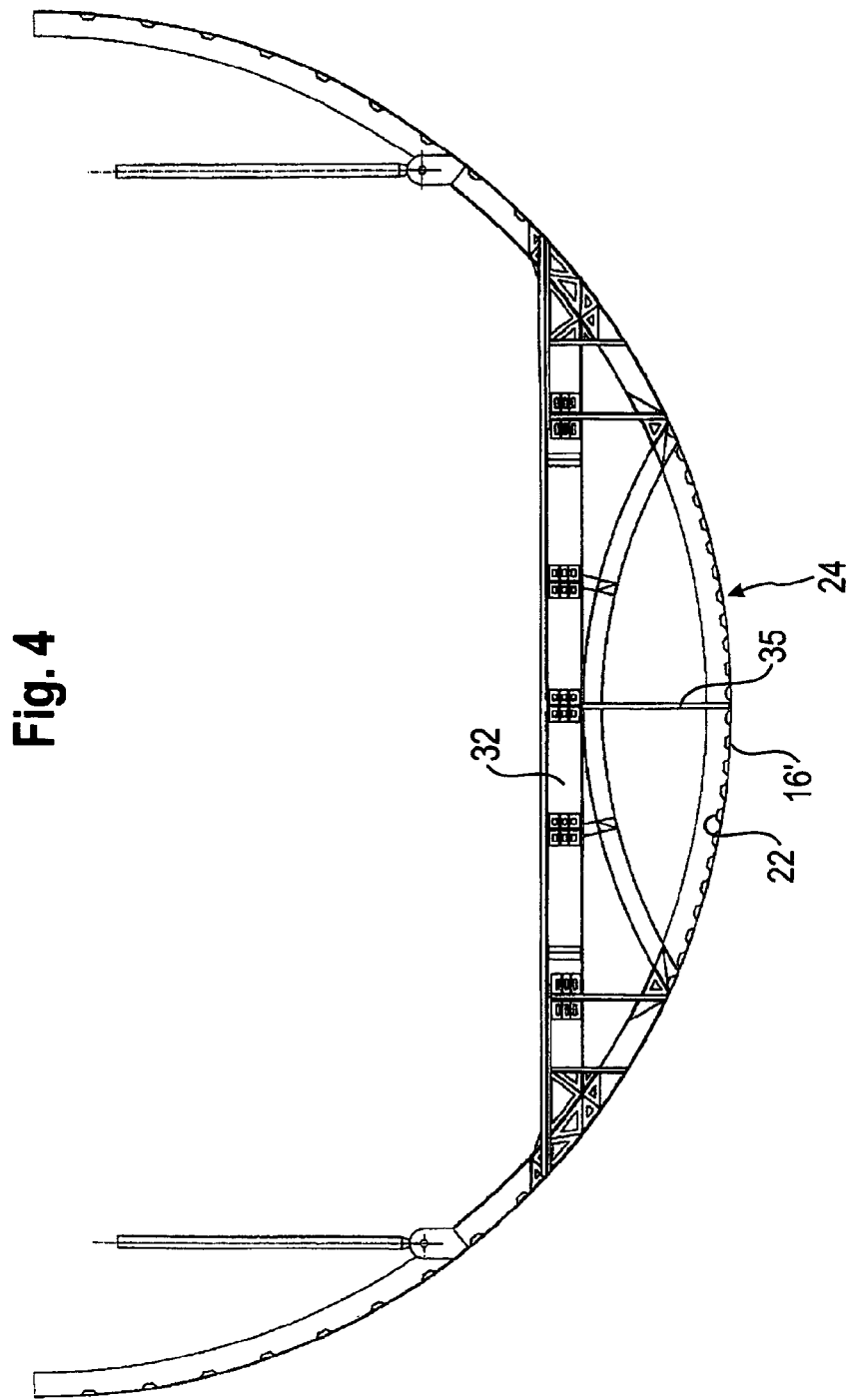
FIG. 4 is the sectional view according to FIG. 2 with an additional central support.

FIG. 4 shows an alternative embodiment to that of FIG. 2, in which a flexible central vertical strut 35 is provided which extends between the transverse floor beam 32 and the impulse-absorbing structural component 24 formed by the central fuselage skin portion 16' and the impulse-absorbing layer 22 and provides additional stabilisation. However, the vertical strut 35 is designed to be flexible, such that, although it can take on these stabilisation functions, it does not hinder the above-described indentation of the impulse-absorbing structural component 24 in the case of a belly landing and in particular does not cause any tearing of the central fuselage skin portion 16'. The vertical strut 35 can be designed as a bar-like strut which extends vertically or obliquely to the longitudinal axis of the aircraft or it can be designed as a flexible planar component which extends in a vertical plane in the longitudinal direction of the aircraft.

Figure 5:
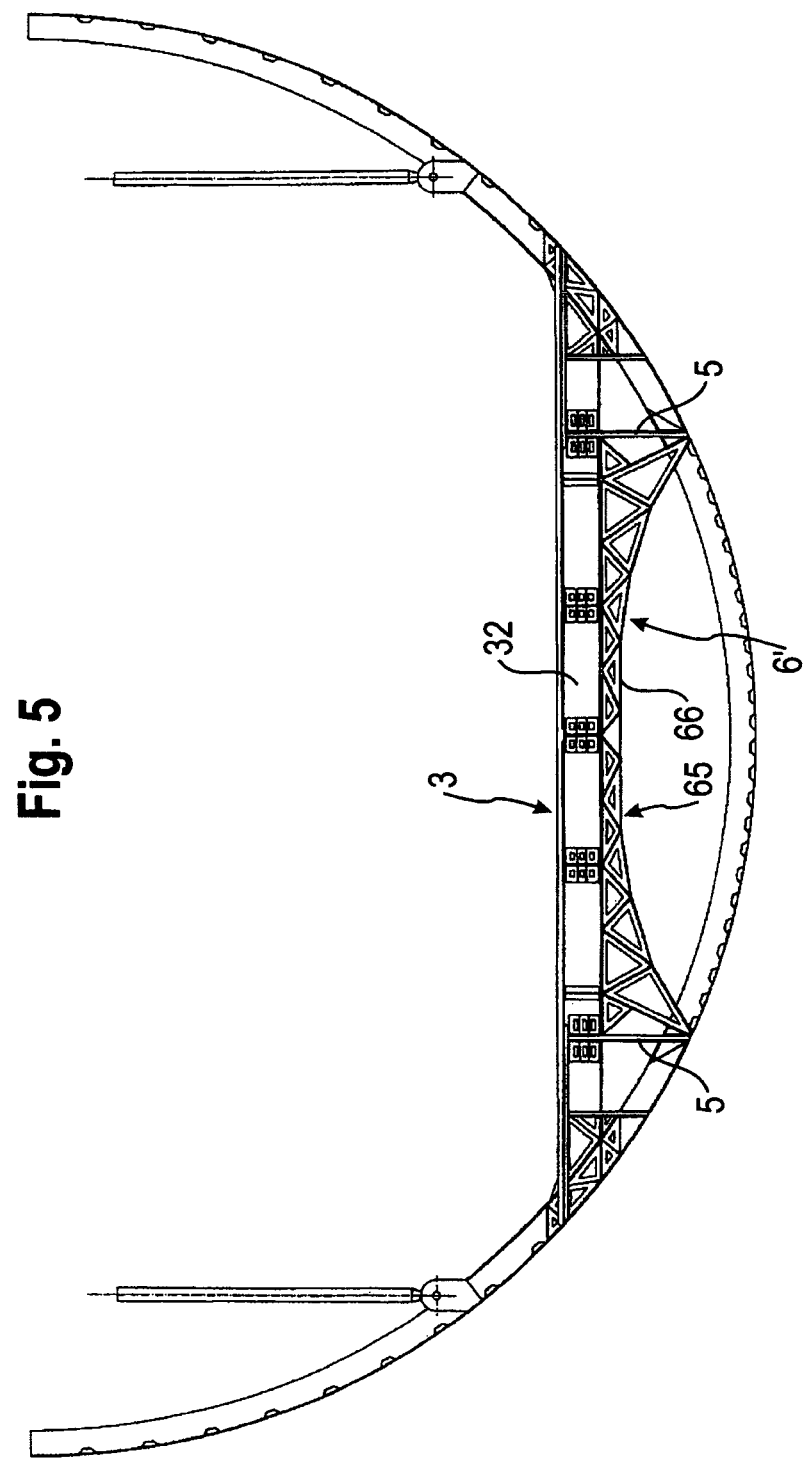
FIG. 5 shows an alternative embodiment to the embodiment shown in FIG. 2, with a curved lattice beam.

FIG. 5 shows an alternative embodiment to the embodiment shown in FIG. 2, in which the curved support structure 6' is formed not by a curved beam as in the example of FIG. 2, but by a lattice 65 which is connected at the upper side thereof to the transverse floor beam 32 of the lower floor structure 3 over the entire width between the two inner vertical longitudinal floor beams 5, and the lower lattice tier 66 of which is curved.

Figure 6:
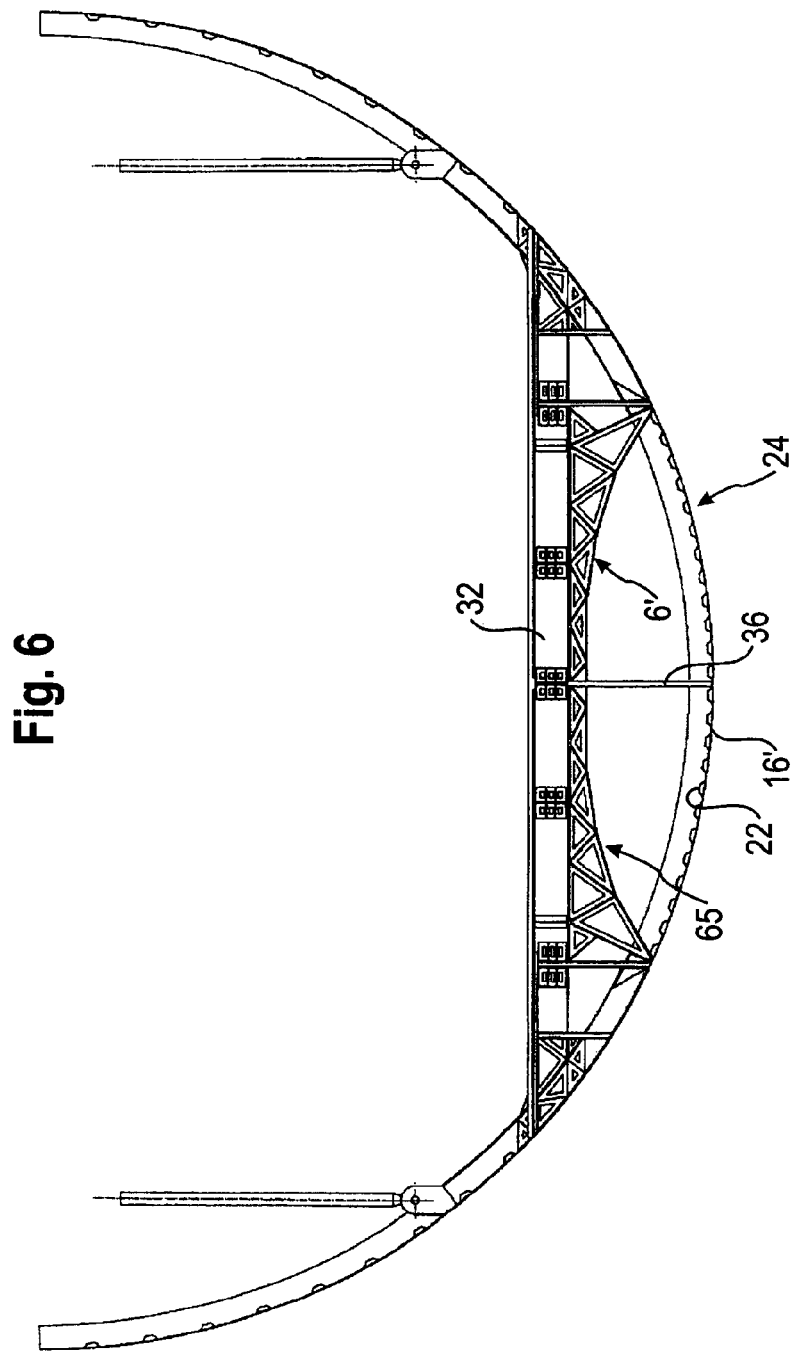
FIG. 6 shows the embodiment of FIG. 5 with an additional central support.

FIG. 6 shows an embodiment which is modified with respect to the variant shown in FIG. 5, comprising a curved support structure 6' which is formed by the lattice 65 and in which, as in the example of FIG. 4, a flexible central vertical strut 36 is provided, which extends between the transverse floor beam 32 and the impulse-absorbing structural component 24 formed by the central fuselage skin portion 16' and the impulse-absorbing layer 22 and provides additional stabilisation. The vertical strut 36 corresponds to the vertical strut 35 in terms of its properties and design, and can thus be designed as a bar-like strut or as a planar component.

FIG. 7 shows the embodiment according to FIG. 4 after an emergency landing on water. It can be seen that the first, inelastically deformable central region 20 of the deformation structure 2 has collapsed into the cavity 21 owing to the aircraft hitting the water surface W. The lower central fuselage skin portion 16' has been pushed inwards towards the centre of the aircraft, but has not been torn open, and therefore there is no leak in the fuselage skin 16. As is clear from FIG. 7, the vertical strut 35 has collapsed and does not obstruct the indentation of the impulse-absorbing structural component 24. The frame 10 has broken into component parts 10' in the region of the central inelastically deformable region 20. Forces are now transmitted between the two broken-off ends of the undamaged part of the frame 10 via the curved support structure 6 and the transverse beam 32 of the lower floor structure 3, and the static framework of the aircraft fuselage therefore does not fail. Even if in this case the outer covering 14 in the lower central fuselage skin portion 16' were to tear, the impulse-absorbing layer 22 is only deformed and ensures the tightness of the fuselage skin 16.

The two lateral inelastically deformable regions 26, 28 are not affected by the aircraft hitting the water surface W and form a type of skid or float which stabilise the aircraft in its longitudinal movement on the water.

Figure 8:
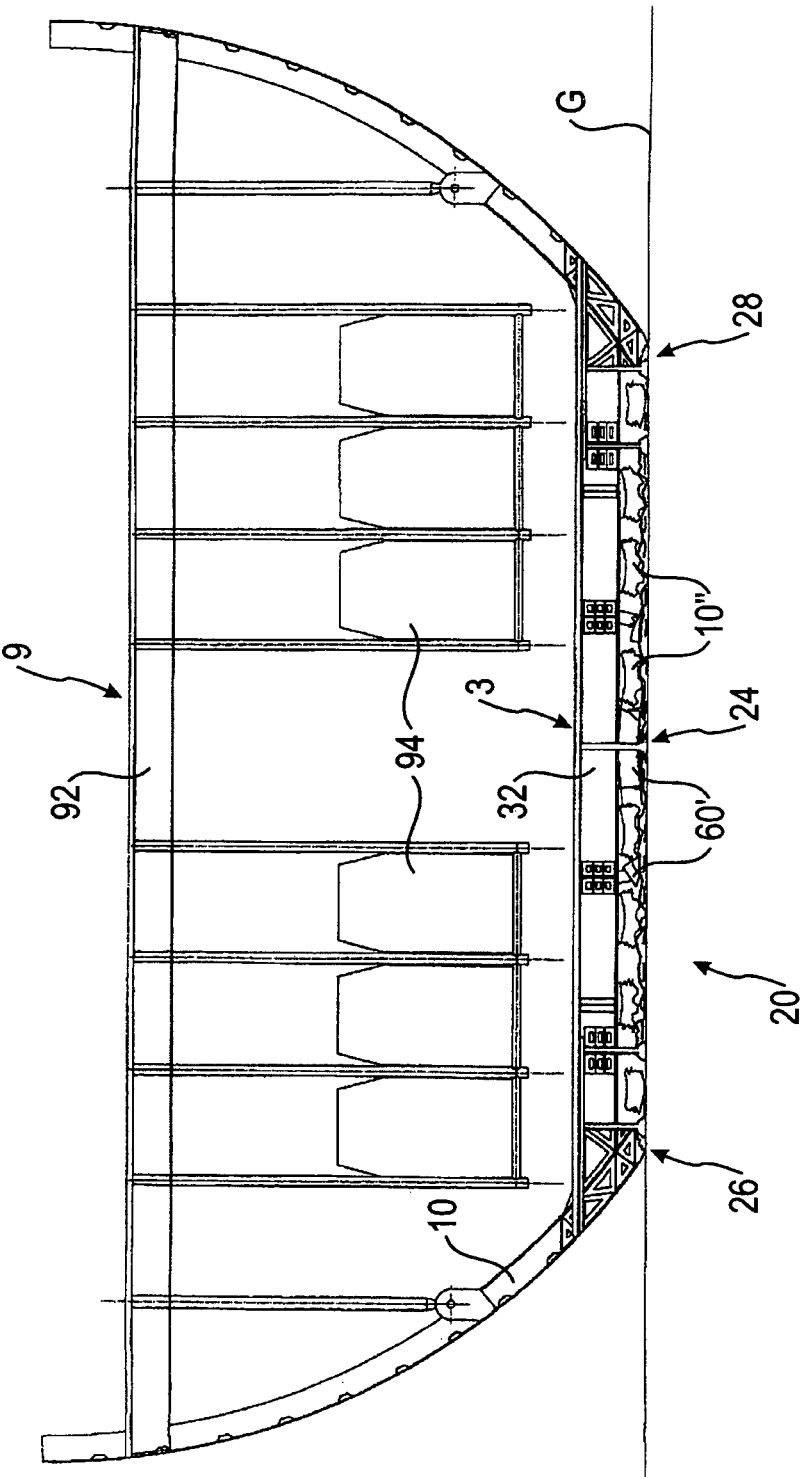
FIG. 8 shows the embodiment according to FIG. 2 after an impact or crash, for example in the case of an emergency landing, on hard ground.

FIG. 8 shows an aircraft fuselage according to an embodiment of the invention, which corresponds in terms of construction to the fuselage shown in FIG. 4, after an impact on solid ground G. FIG. 8 also shows that the aircraft fuselage is provided with an upper floor structure 9 which is constructed in a conventional manner using longitudinal floor beams (not shown) and transverse floor beams 92. Passenger seats 94 are provided in the lower deck, formed between the lower floor structure 3 and the upper floor structure 9, of the aircraft fuselage.

In the state shown in FIG. 8 of the aircraft fuselage after an impact on land, not only has the central impulse-absorbing structural component 24 of the central inelastically deformable region 20 collapsed into the cavity 21—as in the case of the emergency landing on water shown in FIG. 7—but the two lateral inelastically deformable regions 26, 28 have also absorbed impact energy and have been deformed thereby. In the case of this impact on the ground, not only has the frame 10 broken into its component parts 10" in the region between the two lattice-type fittings 7 by which the transverse beam 32 of the lower floor structure 3 is fastened to the frame 10, but the curved beam 60 has also broken into component parts 60'. In this case, the static stability of the fuselage in the peripheral direction is still maintained by the remaining region of the frame 10, the lower transverse floor beam 32 and the upper transverse floor beam 92.

Figure 9:
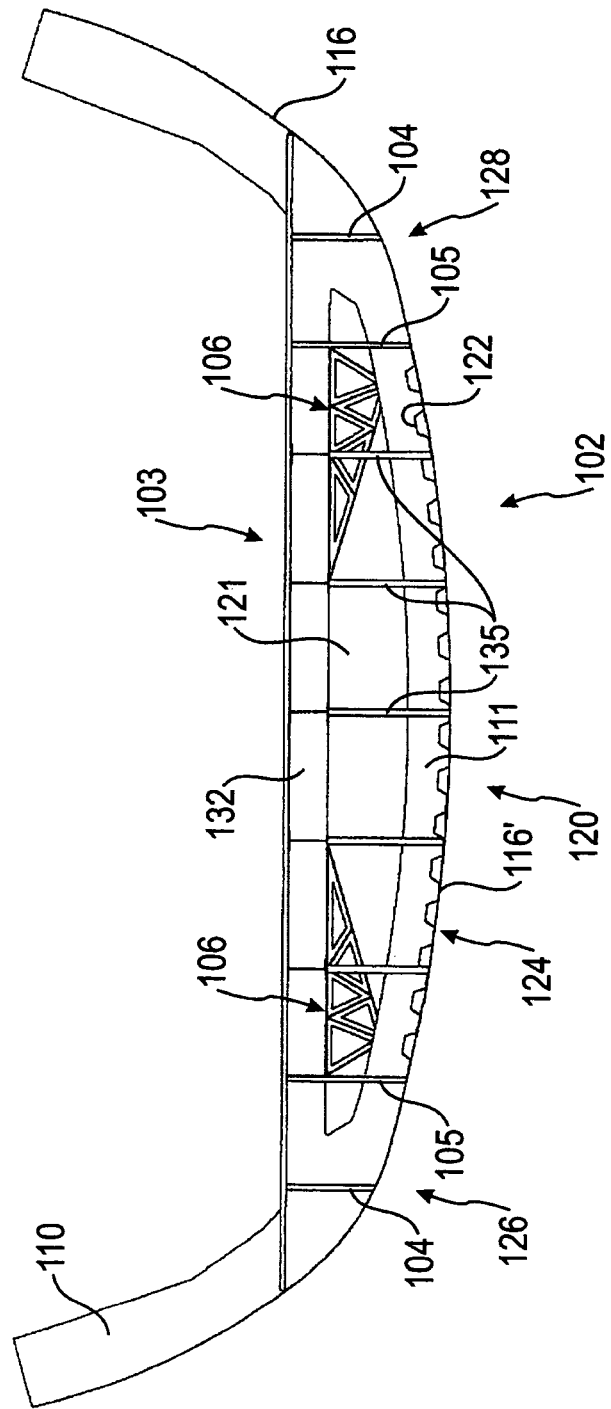
FIG. 9 shows a further alternative embodiment of the fuselage according to the invention in a wide-body freight aircraft.

FIG. 9 is a schematic view of a modified embodiment of the lower part of a fuselage segment of an aircraft fuselage according to the invention for, for example, a transport aeroplane. The lower transverse floor beam 132 and the lower part 111 of the frame 110 are designed as an integral structural component. In addition to the two outer longitudinal floor beams 104, 105 of the lower floor structure 103, a plurality of vertical longitudinal beams 135 are provided which brace the lower transverse floor beam 132 against the lower part of the frame 110 and the fuselage skin 116. These longitudinal beams 135 are designed to be substantially more flexible than the lateral longitudinal floor beams 104 and 105, such that, although the longitudinal beams 135 can support the forces acting on the lower floor structure 103 owing to the load which has been loaded, they collapse along with the deformation structure 102 in the case of a crash landing on water or on solid ground.

In this case too, the deformation structure 102 comprises a central inelastically deformable region 120 provided with an impulse-absorbing structural component 124, which likewise comprises an impulse-absorbing layer 122 which is provided on the inner face of the central fuselage portion 116' and is designed as in the preceding examples. As in the preceding examples, the deformation structure 102 further comprises two lateral inelastically deformable regions 126, 128, which in principle are constructed as described in connection with the preceding examples and which in particular comprise the very rigid lateral longitudinal floor beams 104, 105 of the lower floor structure 103.

Instead of the curved support structure, in the example shown in FIG. 9 two lateral lattice beams 106 are provided which extend between the transverse floor beam 132 and the lower frame portion 111 and are arranged adjacent to the sides of the inner lateral longitudinal floor beam 105. The two lattice beams 106 extend, at the lower side thereof, from the lower frame portion 111 up to the transverse floor beam 132 and are spaced far apart from each other laterally, such that a cavity 121 remains between the lower frame portion 111, the lower transverse floor beam 132, and the two lattice beams 106 and the inner lateral longitudinal floor beams 105, into which cavity the impulse-absorbing structural component 124 and the lower central frame portion 111 can collapse in the case of the aircraft hitting water or solid ground.

Figure 10:
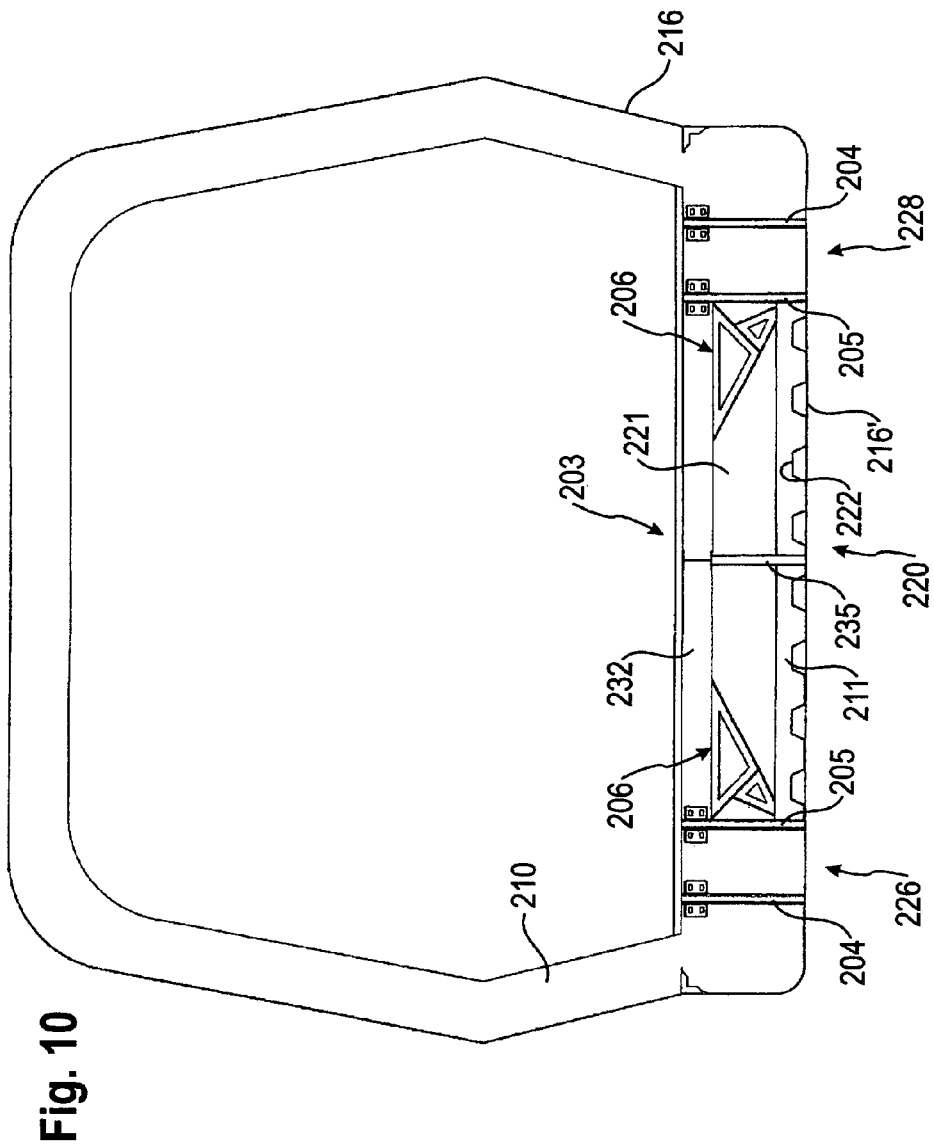
FIG. 10 shows a further alternative embodiment of the aircraft fuselage according to the invention for a helicopter.

FIG. 10 shows a modified embodiment of the fuselage segment shown in FIG. 9, having a box-shaped outer contour, as is typical for helicopters, in particular for cargo helicopters. In this case too, the lower central portion 211 of the frame 210 and the transverse floor beam 232 of the lower floor structure 203 form an integral profile with a cavity 221 provided between the lower transverse floor beam 232 and the central lower frame portion 211.

The lateral longitudinal floor beams 204, 205 are designed in the same manner as in the preceding examples and form the core components of the lateral inelastically deformable regions 226, 228. The central inelastically deformable region 220 is likewise constructed as in the preceding examples and comprises in particular an impulse-absorbing structural component 224 having an impulse-absorbing layer 222 which is provided on the inner face of the lower central fuselage skin portion 216' of the fuselage skin 216 and is designed in the same way as the impulse-absorbing layer 22 of the examples described at the outset.

In the example of FIG. 10 too, two lateral lattice beams 206 are provided which extend between the lower transverse floor beam 232 and the lower frame portion 211 and, adjacent to the respective inner faces of the inner longitudinal floor beams 205, are spaced far apart from each other. In the case of these two lateral lattice beams 206 too, the lower tier of the beam extends, as in the case of the lattice beams 106 of the example in FIG. 9, obliquely upwards towards the centre such that a sufficient cavity 221 is available into which the central inelastically deformable region 220 can collapse.

A flexible central longitudinal beam 235 extends from the transverse floor beam 232 to the lower frame portion 211 and to the lower fuselage skin portion 216' and, like the additional longitudinal beam 135 in the example in FIG. 9, ensures that the load mounted on the floor structure 203 is optimally supported in the fuselage frame 210. However, the additional central longitudinal beam 235 is flexible enough that it does not significantly resist the indentation of the central inelastically deformable region 220 inwards into the cavity 221 and in particular does not cause the lower fuselage skin portion 216' to tear.

All the examples shown are thus designed in such a way that only the central inelastically deformable region 20, 120, 220 is pushed into the cavity 21, 221, 221 formed behind it in the case of an emergency landing on water, without the fuselage skin being damaged, that is to say a leak occurring in the fuselage skin. Only in the case of a more powerful impact, as occurs in the case of a crash landing on solid ground, are the lateral inelastically deformable regions 26, 28; 126, 128; 226, 228 also deformed in order to absorb the greater impact forces caused by the solid ground, which yields less than a water surface. In this case of impact on solid ground, the criterion of the tightness of the fuselage skin is no longer in the foreground, and therefore in this case destruction of the fuselage skin also contributes to energy absorption.

Reference signs in the claims, the description and the drawings serve merely to facilitate understanding of the invention and are not intended to limit the scope of protection.

While the invention has been particularly shown and described with reference to preferred embodiments thereof, it will be understood by those skilled in the art that various changes in form and details may be made therein without departing from the spirit and scope of the invention.

LIST OF REFERENCE SIGNS 1 aircraft fuselage
2 deformation structure
3 lower floor structure
4 longitudinal beam
5 longitudinal beam
6 support structure
6' support structure
7 fitting
8 box profile
9 upper floor structure
10 frame
10' component parts of the frame 10
10" component parts of the frame 10
12 longitudinal fuselage beam
14 covering
16 fuselage skin
16' fuselage skin portion
18 vertical strut
19 vertical strut
20 central inelastically deformable region
21 cavity
22 impulse-absorbing layer
24 impulse-absorbing structural part
26 lateral inelastically deformable region
28 lateral inelastically deformable region
30 longitudinal beam
31 fastening bracket
32 transverse beam
33 fastening bracket
34 floor panel
35 vertical strut
36 vertical strut
40 fastening bracket
41 fastening bracket
42 fastening bracket
60 curved beam
60' component parts of the curved beam
61 support
62 support
65 lattice
66 lattice tier
70 rib
80 cover plate
92 transverse floor beam
94 passenger seat
102 deformation structure
103 floor structure
104 longitudinal floor beam
105 longitudinal floor beam
106 lattice beam
110 frame
111 lower frame portion
116 fuselage skin
116' central fuselage skin portion
120 central inelastically deformable region
121 cavity
122 impulse-absorbing layer
124 impulse-absorbing structural component
126 lateral inelastically deformable region
128 lateral inelastically deformable region
132 transverse floor beam
135 vertical longitudinal beam
203 floor structure
204 longitudinal floor beam
205 longitudinal floor beam
206 lateral lattice beam
210 frame
211 lower central frame portion
216 fuselage skin
216' lower fuselage skin portion
220 central inelastically deformable region
221 cavity
222 impulse-absorbing layer
224 impulse-absorbing structural component
226 lateral inelastically deformable region
228 lateral inelastically deformable region
232 transverse floor beam
235 additional central longitudinal beam
G solid ground
W water surface

The invention claimed is:

1. An aircraft fuselage with an integrated energy-absorbing deformation structure, the fuselage comprising:
annular frames;
longitudinal fuselage beams interconnecting the annular frames;
a covering forming a fuselage skin;
a lower floor structure disposed in an interior of the fuselage, the lower floor structure including a plurality of transverse beams and longitudinal floor beams which interconnect said transverse beams, each transverse beam being connected to an assigned frame of the annular frames;
a deformation structure formed in a lower fuselage region, the deformation structure including a first inelastically deformable central region and, on a left-hand side and a right-hand side, respective second inelastically deformable regions of greater stiffness in a vertical direction than the central region, each of the second inelastically deformable regions including an extended longitudinal floor beam of the longitudinal floor beams, each extended longitudinal floor beam including an upper region connected to the transverse beams of the lower floor structure and extending downward beyond the transverse beams of the lower floor structure to a lower region that is connected to the annular frames of the fuselage; and
a support structure, the support structure extending in a transverse direction of the aircraft and interconnecting the lower region of the extended longitudinal floor beam of the left-hand side second inelastically deformable region with the lower region of the extended longitudinal floor beam of the right-hand side second inelastically deformable region, for force transmission in the transverse direction.

2. The aircraft fuselage recited in claim 1, wherein the first inelastically deformable region disposed between the two second inelastically deformable regions includes an impulse-absorbing structural component having an impulse-absorbing layer disposed on an inner face of the fuselage skin that includes a regular pattern of elevations and depressions such that the impulse-absorbing layer is undulating.

3. The aircraft fuselage recited in claim 2, wherein no longitudinal fuselage beams which brace the lower floor structure against the fuselage skin or the frames are provided in a portion of the fuselage that is disposed between the two inelastically deformable regions and that forms the first inelastically deformable region.

4. The aircraft fuselage recited in claim 1, wherein the support structure arches inwards in a curved manner towards a centre of the aircraft and is connected, at least in a central portion, to a respective transverse beam of the lower floor structure.

5. The aircraft fuselage recited in claim 1, wherein the support structure includes a lattice or a curved beam.

6. The aircraft fuselage recited in claim 1, wherein the extended longitudinal floor beams, the transverse beams of the lower floor structure, and the annular frames, together with the covering of the fuselage that is connected to the annular frames, form a box profile that is resistant to bending and warping.

7. The aircraft fuselage recited in claim 6, wherein floor panels connected to the lower floor structure form a portion of the box profile.

8. The aircraft fuselage recited in claim 1, wherein fittings connect the transverse beams of the lower floor structure to the annular frames, the fittings being fastened to a side end of a respective transverse beam and to a respective frame.

9. An aircraft comprising a fuselage with an integrated energy-absorbing deformation structure, the fuselage including:
   annular frames;
   longitudinal fuselage beams interconnecting the annular frames;
   a covering forming a fuselage skin;
   a lower floor structure disposed in an interior of the fuselage, the lower floor structure including a plurality of transverse beams and longitudinal floor beams which interconnect said transverse beams, each transverse beam being connected to an assigned frame of the annular frames;
   a deformation structure formed in a lower fuselage region, the deformation structure including a first inelastically deformable central region and, on a left-hand side and a right-hand side, respective second inelastically deformable regions of greater stiffness in a vertical direction than the central region, each of the second inelastically deformable regions including an extended longitudinal floor beam of the longitudinal floor beams, each extended longitudinal floor beam including an upper region connected to the transverse beams of the lower floor structure and extending downward beyond the transverse beams of the lower floor structure to a lower region that is connected to the annular frames of the fuselage; and
   a support structure, the support structure extending in a transverse direction of the aircraft and interconnecting the lower region of the extended longitudinal floor beam of the left-hand side second inelastically deformable region with the lower region of the extended longitudinal floor beam of the right-hand side second inelastically deformable region, for force transmission in the transverse direction.

10. The aircraft recited in claim 9, wherein the aircraft is a fixed-wing aircraft.

11. The aircraft recited in claim 9, wherein the aircraft is a rotorcraft.

12. The aircraft fuselage recited in claim 8, wherein the fittings include ribs which are arranged in the form of a lattice and extend in a direction of force components of forces to be transmitted by the respective fitting.

\* \* \* \* \*